United States Patent [19]

Hansen et al.

[11] 4,283,646

[45] Aug. 11, 1981

[54] BRUSHLESS ELECTRIC MOTOR

[75] Inventors: Poul E. Hansen, Guderup; Jan Dyhr, Høruphav, both of Denmark

[73] Assignee: Danfoss A/S, Nordborg, Denmark

[21] Appl. No.: 131,216

[22] Filed: Mar. 17, 1980

[30] Foreign Application Priority Data

Apr. 5, 1979 [DE] Fed. Rep. of Germany ....... 2913691

[51] Int. Cl.³ .............................................. H02K 37/00
[52] U.S. Cl. .................................... 310/126; 310/268
[58] Field of Search ................ 310/112, 114, 126, 268

[56] References Cited

U.S. PATENT DOCUMENTS

| | | | |
|---|---|---|---|
| 3,261,998 | 7/1966 | Bosco, Jr. et al. | 310/126 |
| 3,304,450 | 2/1967 | Bosco, Jr. et al. | 310/126 |
| 3,311,767 | 3/1967 | Faulkner | 310/268 X |
| 3,441,763 | 4/1969 | Patrignani | 310/268 X |
| 3,466,479 | 9/1969 | Jarret et al. | 310/268 X |
| 3,467,844 | 9/1969 | Bird | 310/268 X |
| 3,803,431 | 4/1974 | Inaba et al. | 310/268 X |

Primary Examiner—Donovan F. Duggan
Attorney, Agent, or Firm—Wayne B. Easton

[57] ABSTRACT

The invention relates to a brushless type electric motor having an axial air gap and is directed to a particular design and arrangement for the pole shoes thereto.

13 Claims, 7 Drawing Figures

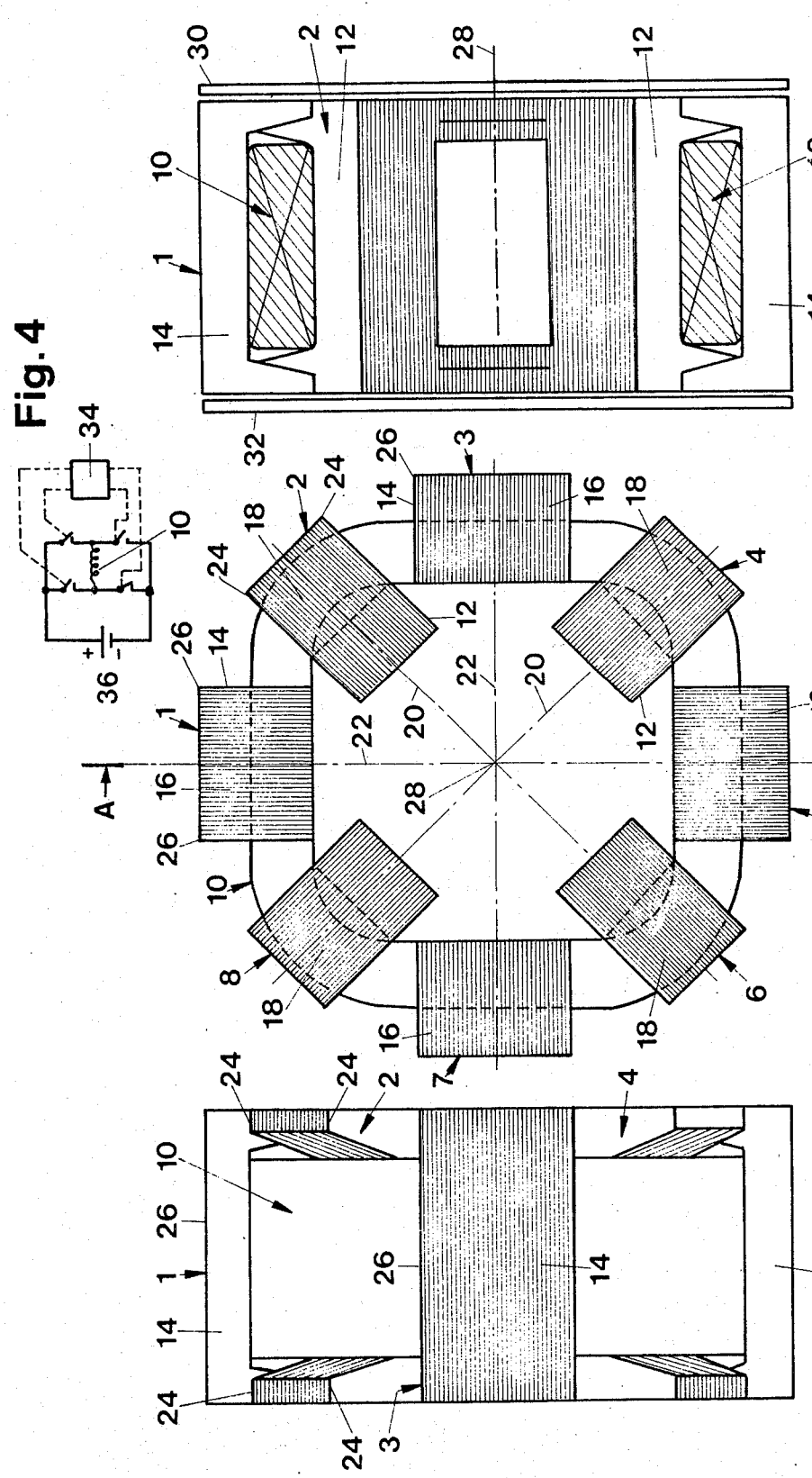

BRUSHLESS ELECTRIC MOTOR

The invention relates to a brushless electric motor with an axial air gap, comprising a stator winding coaxial with the rotary axis and substantially U-shaped laminated pole shoes which engage over the stator winding in alternately opposite radial directions and at equal angular spacings and have end faces with radial axes of symmetry facing a radial surface with permanent magnetic poles of a ferromagnetic rotor plate, the end faces of all the evenly numbered pole shoes being elongate rectangles with a radial longitudinal axis of symmetry and the transverse yokes of all the evenly numbered pole shoes being disposed radially inwardly.

In a known electric motor of this kind, the limbs of the individual pole shoes have different lengths. Within the stacks of laminations of the odd numbered pole shoes, the laminations are alternately turned through 180° in relation to a radial axis so that their pole shoe end face is formed by alternately short and long limbs of the laminations of a pole shoe and the circumferential extent of the odd numbered pole shoes decreases towards the rotary axis. This makes it possible to reduce the spacing of the pole shoes to a minimum which depends on the air gap, without increasing the outer circumference of the odd numbered pole shoes and thus the circumference of the rotor plate, whereby their moment of inertia and centrifugal forces can be kept small. However, this arrangement gives rise to considerable expense during assembly of the motor.

The invention is based on the problem of providing an electric motor of the aforementioned kind with a construction that is simpler and yet more compact while maintaining a minimum spacing of the pole shoes in the circumferential direction.

According to the invention, this problem is solved in that the end faces of all the pole shoes are substantially equal and the transverse axes of symmetry of all the odd numbered pole shoes extend radially.

With this construction and arrangement of the pole shoes, not only the laminations of the evenly numbered but also of the odd numbered pole shoes can be disposed uniformly. This simplifies assembly. At the same time, there is better utilisation of the spaces between two adjacent evenly numbered pole shoes by the interposed odd numbered pole shoes. The available cross-sections of the laminations of the evenly numbered pole shoes are more efficiently utilised so that the construction of the motor can be more compact with the same power.

It is favourable if the yoke cross-sections of the evenly numbered pole shoes are substantially equal to the yoke cross-sections of the odd numbered pole shoes. The effective magnetic circuit resistance primarily determined by these yoke cross-sections is therefore the same for all the magnetic poles which are each formed by a magnetic circuit between two adjacent pole shoes, so that the torque is uniform.

If the ratio of length to width of the end faces is approximately 1.5, one can obtain a particularly compact construction with a high degree of utilisation of the effective cross-sections of the laminations.

Further, provision may be made for the stator winding to consist of sections which are alternately rectilinear and curved in the circumferential direction and for the odd numbered pole shoes to engage over the rectilinear sections. In this way, a larger radial thickness of the stator winding can be selected with a practically unchanged amount of lamination material for the pole shoes, so that the torque or power can be increased relatively to a circular winding with an otherwise unchanged construction. In relation to the power, the construction is thus more compact.

Preferably, the radially outer axial edges of the pole shoes are here disposed on the same circle.

A second rotor plate similar to the first may be disposed on the same shaft as is the first plate and on the opposite side of the stator winding. This results in a further increase in the torque compared with only one rotor plate. Preferably, the cross-section of the pole shoe limbs decreases towards the free ends with the limb width remaining constant. This increases the magnetic resistance of the pole shoe limbs towards their free ends to a very high value so that the magnetic flux is forced to enter and leave primarily at the end faces of the pole shoes rather than at the side faces and free ends of the limbs where it makes no contribution to the torque. Stray flux is thus reduced. A still further reduction in stray flux is obtained if the cross-section of the pole shoe limbs decreases to zero.

It is particularly favourable if the decrease is more than linear. This not only increases the magnetic flux density in the pole shoe end faces but also the winding space for the stator winding between the pole shoe limbs. Consequently, for the same number of windings of the stator coil and the same motor power, the dimensions (the diameter) can be reduced or for the same dimensions the number of windings and thus the power can be increased to result in a still more compact construction.

Preferably, the end face of each pole shoe is three to four times the size of the smallest yoke cross-section of each pole shoe. Referred to a particular power, this limits the magnetic flux density (induction) in the pole shoe and it is not substantially exceeded by the saturation of the pole shoe material occurring on an over-current. Accordingly, even with an over-current in the stator winding, for example by reason of an overload or short-circuit, the danger of demagnetisation of the permanent magnetic poles by the magnetic field of the stator winding is avoided.

More particularly, this can be achieved in that the yoke cross-section decreases towards the middle of the transverse yokes and/or the transverse yokes of the pole shoes have a recess.

To avoid eddy current and hysteresis losses, it is desirable to laminate the rotor plate. This can be effected by forming the rotor plate of sheet metal laminations which are stacked in the axial direction. Still better, the rotor plate may comprise a sheet metal coil. The avoidance of high losses also contributes to a more compact construction.

Altogether, the compact construction leads to a reduction in the inertia and centrifugal forces in the rotor.

The invention and its modifications will now be described in more detail with reference to preferred examples. In the drawings:

FIG. 1 is an axial view of the stator of an electric motor according to the invention without the rotor and without the housing;

FIG. 2 is the axial section A—A of the FIG. 1 stator with rotor;

FIG. 3 is a radial view of the FIG. 1 stator;

FIG. 4 is a circuit diagram of the current supply and control means of the electric motor;

Figure 5:
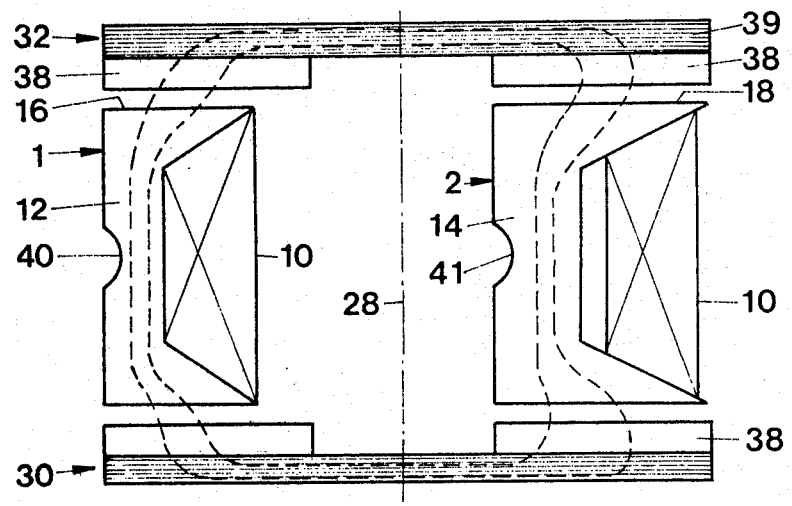
FIG. 5 is an axial section of a further example of electric motor.

The stator of the electric motor shown in FIGS. 1 to 4 comprises eight substantially U-shaped laminated pole shoes 1 to 8 which straddle a substantially square stator winding 10 having rounded corners. The limbs of the odd numbered pole shoes 1, 3, 5, 7 are of the same length and extend substantially radially inwardly. The limbs of the evenly numbered pole shoes 2, 4, 6, 8 are likewise equally long and extend substantially radially outwardly. The transverse yokes 12 of the evenly numbered pole shoes 2, 4, 6, 8 are disposed radially inwardly and the transverse yokes 14 of the odd numbered pole shoes 1, 3, 5, 7 radially outwardly. All the transverse yokes 12, 14 extend in the axial direction (of the motor). The odd numbered pole shoes 1, 3, 5, 7 engage over the rectilinear sections and the evenly numbered pole shoes 2, 4, 6, 8 engage over the sections at the corners of the stator winding 10 that are arcuately curved through 90°.

The end faces 16 of the odd numbered pole shoes 1, 3, 5, 7 are identical. The end faces 18 of the evenly numbered pole shoes 2, 4, 6, 8 are also identical. All the end faces 16, 18 form elongate rectangles, the end faces 18 of the evenly numbered pole shoes being substantially equal to the end faces 16 of the odd numbered pole shoes and the longitudinal axes of symmetry 20 extending, whereas the transverse axes of symmetry 22 of the odd numbered pole shoes extend radially.

The axes of symmetry 20 and 22 of the pole shoes have equal angular spacings of about 45° and the axially outer edges 24, 26 of all the pole shoes 1 to 8 lie on the same circle about the rotary axis 28 of the rotor shaft (not shown).

Two rotor plates 30 and 32 of ferromagnetic material are fixed on the rotor shaft. By means of permanent magnets (not shown), alternate North and South poles are formed at equal angular spacings on the radial sides of the rotor plates 30, 32 that face the end faces 16, 18 of the pole shoes.

Control means 34 which detect the angular position of the rotor 30, 32 even on standstill by means of a sensor control four bridge-connected electronic switches (illustrated as contacts) in synchronism with the rotor speed. The stator winding 10 is disposed in the cross-branch of the bridge circuit. The control of the electronic switches is such that the stator winding 10 is traversed in alternate directions by the current from a D.C. voltage source 36. The magnetic field formed by the stator winding 10 and leaving one end face 16 of a pole shoe 1 enters the confronting radial face of the associated rotor plate through the adjoining axial air gap and out again through the same radial face opposite the end face 18 of the adjacent pole shoe 2 and into said end face 18. However, at the other axial end of the stator this magnetic field leaves the end face 18 of the same pole shoe 2 and again enters the end face 16 of the first pole shoe 1 by way of the rotor plate 32. In this way a magnetic circuit of a stator pole is closed through the transverse yokes 12, 14 of two adjacent pole shoes and the rotor plates. Like magnetic circuits are closed by way of all adjacent pole shoes and the rotor plates. Accordingly, magnetic poles of alternating polarity from one pole shoe to the other follow each other in the circumferential direction in the stator. The polarity of each magnetic pole of the stator also changes in synchronism with the speed of the rotor so that a rotary field is produced and rotation of the rotor is automatically maintained after starting. Means for facilitating starting have been omitted for the sake of clarity. We are therefore here concerned with a brushless D.C. motor.

The radial cross-sections of all the transverse yokes are of substantially equal area so that the magnetic resistance in the magnetic circuits of all the stator poles is practically the same and a uniform torque is set up.

The radial arrangement of the transverse axes of symmetry 22 of the odd numbered pole shoes 1, 3, 5, 7 has the advantage that the outer diameter of the stator and thus that of the rotor can be kept small to achieve a lower moment of inertia and lower centrifugal forces in the rotor in comparison with a 90° displaced arrangement and construction of the odd numbered pole shoes as for the evenly numbered ones. The space between two adjacent evenly numbered pole shoes is more efficiently utilised. Despite this, two different sheet metal stampings will suffice for all the pole shoes. In conjunction with the square ring shape of the stator winding 10 that is rounded at the corners, the space available between the limbs of the pole shoes for receiving the stator winding 10 is utilised to a maximum despite the rectangular shape of the pole shoe end faces.

In this connection, it is particularly favourable to have a length to width ratio of 3:2 for the pole shoe end faces.

FIG. 5 diagrammatically illustrates a somewhat modified example as a partial axial section through the pole shoes 1 and 2, the pole shoes 1 and 2 which are in reality offset by only 45° to each other in the circumferential direction being illustrated offset by 180° (turned into the plane of the drawing). In this example, the rotor plates 30, 32 are provided with stamped out permanent magnetic poles 38 and laminated. The sheet metal laminations 39 are stacked in the axial direction so that the principal components of the magnetic flux extending from one pole shoe to the other lie in the planes of the laminations and the eddy currents produced by these principal components are interrupted. The limbs of the pole shoes converge substantially linearly towards the free ends practically to zero with the width remaining the same so that their magnetic resistance increases to a very high value towards the free ends because of the decreasing cross-section and the magnetic flux is forced to enter and leave primarily at the end faces 16, 18 of the pole shoes instead of at the side faces or at the free ends of the limbs where it makes no contribution towards the torque. This reduces stray flux. In addition, at the middle of the transverse yokes 12 and 14 there are recesses 40 and 41 which extend across the entire width of the transverse yokes and reduce the yoke cross-section to such an extent that the magnetic flux is limited to a permissible maximum value up to which the permanent magnets 38 will not be demagnetised by the magnetic field of the winding 10, for example when there is an overcurrent. A favourable ratio of the end area of the pole shoe to the cross-sectional area of the yoke is between 3 and 4.

Figure 6:
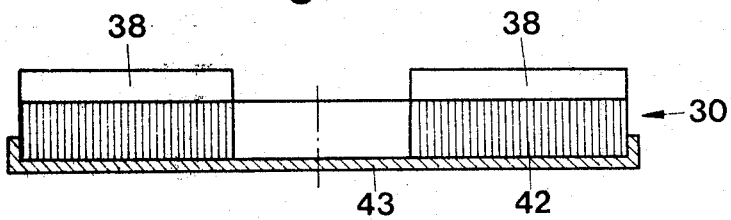
FIG. 6 is a part-axial section of a further example of the rotor plate construction.

FIG. 6 shows an example of a modified rotor plate 30 in which the lamination is obtained as a spirally-shaped sheet metal coil 42 (much like a clock spring). In this case, the eddy current paths formed by the axial components of the magnetic flux in the rotor plate are likewise interrupted by the lamination. A retaining plate is designated 43.

Figure 7:
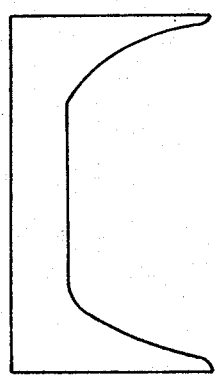
FIG. 7 is a side elevation of a further embodiment of a pole shoe.

FIG. 7 shows a further example of a pole shoe in side elevation, wherein the limb cross-section decreases towards the free end more than linearly with the limb width remaining constant. Apart from producing better guiding for the magnetic flux towards the end faces, this gives a larger winding space for the stator winding or better utilisation of the winding space and thus a more compact construction.

In one embodiment, the odd numbered pole shoe end faces 16 were about 21 mm wide and 28.6 mm long, the evenly numbered pole shoe end faces 18 were about 20 mm wide and 30 mm long, the outer diameter of the stator between two diametrally opposed axial edges 26 or 24 was about 112 mm and the spacing of the transverse yokes 14 of two diametrally opposed odd numbered pole shoes was about 90 mm long.

For interlocking purposes, the stator winding 10 and the pole shoes are cast in synthetic resin (not shown) leaving the pole shoe end faces and a central bore for inserting the rotor shaft free.

Instead of the one rotor plate it is also possible to connect a plate of ferromagnetic material for forming the magnetic circuits of the stator poles (without air gap) securely to the confronting end faces of the pole shoes and to employ only one rotor plate. However, the use of two rotor plates gives a higher torque with a small rotor diameter.

What is claimed:

1. A brushless electric motor with an axial air gap relative to a rotary axis thereof, comprising, rotor means and a stator winding coaxial with said rotary axis, first and second sets of alternately arranged U-shaped laminated shoes attached to said stator winding at equal angular spacings, said pole shoes having rectangularly shaped end faces of substantially equal area cooperable with said rotor means with said end faces of said first set of shoes having a radial transverse line of symmetry and said end faces of said second set of shoes having a radial longitudinal line of symmetry, and said first and second sets of shoes having yokes disposed respectively radially outwardly and inwardly of said stator winding.

2. A brushless electric motor according to claim 1 wherein cross-sections of said yokes of said shoes are substantially equal.

3. A brushless electric motor according to claim 1 wherein said rectangularly shaped end faces of said poles each has a length to width radio of approximately 1.5.

4. A brushless electric motor according to claim 1 wherein said stator winding has sections which are alternately curved and rectilinear which are respectively engaged by said first and second sets of said poles.

5. A brushless electric motor according to claim 4 wherein the radially outer edges of said pole end faces intersect said respective radial axes thereof in a circular locus of points.

6. A brushless electric motor according to claim 1 wherein said rotor means includes first and second rotor plates on opposite sides of said stator winding.

7. A brushless electric motor according to claim 1 wherein said pole shoes each have generally tapered limbs of constant width.

8. A brushless electric motor according to claim 7 wherein the terminal ends of said limbs form apexes.

9. A brushless electric motor according to claim 7 wherein said generally tapered limbs are each formed with at least one curvalinear surface.

10. A brushless electric motor according to claim 1 wherein each said pole shoe has a yoke with a cross-section area which is approximately 3 tenths the area of the respective end face thereof.

11. A brushless electric motor according to claim 1 wherein each said pole shoe has a yoke with the outer side thereof having a recess to provide a predetermined cross-sectional area at that point to control the magnitude of the magnetic flux therethrough.

12. A brushless electric motor according to claim 1 wherein said rotor means includes a laminated rotor plate.

13. A brushless electric motor according to claim 12 wherein said laminated rotor plate has the form of a sheet metal coil.

* * * * *